(12) United States Patent
Hayashida

(10) Patent No.: US 11,778,114 B2
(45) Date of Patent: Oct. 3, 2023

(54) INFORMATION PROCESSING APPARATUS, METHOD, AND NON-TRANSITORY COMPUTER READABLE MEDIUM FOR ENHANCED SECURITY OF PRIVATELY MANAGED BOX

(71) Applicant: FUJIFILM Business Innovation Corp., Tokyo (JP)

(72) Inventor: Toshiharu Hayashida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/711,315

(22) Filed: Apr. 1, 2022

(65) Prior Publication Data

US 2023/0064878 A1   Mar. 2, 2023

(30) Foreign Application Priority Data

Sep. 2, 2021   (JP) .................................. 2021-143135

(51) Int. Cl.
*H04N 1/00*   (2006.01)
*H04N 1/44*   (2006.01)

(52) U.S. Cl.
CPC ....... *H04N 1/00766* (2013.01); *H04N 1/4413* (2013.01); *H04N 1/4433* (2013.01)

(58) Field of Classification Search
CPC .................................................... H04N 1/00766
USPC ......................................................... 358/1.14
See application file for complete search history.

(56) References Cited

U.S. PATENT DOCUMENTS

| | | | | |
|---|---|---|---|---|
| 2006/0285160 A1* | 12/2006 | Tomita | ................... | H04N 1/324 |
| | | | | 358/1.15 |
| 2007/0211282 A1* | 9/2007 | Okada | ................... | G06F 21/608 |
| | | | | 358/1.15 |
| 2008/0204785 A1* | 8/2008 | Inui | ...................... | H04N 1/4413 |
| | | | | 358/1.13 |
| 2010/0284035 A1* | 11/2010 | Kil | ........................ | G06F 3/1222 |
| | | | | 358/1.15 |

FOREIGN PATENT DOCUMENTS

JP   2002135602 A   5/2002

* cited by examiner

*Primary Examiner* — Jacky X Zheng
(74) *Attorney, Agent, or Firm* — Oliff PLC

(57) ABSTRACT

An information processing apparatus includes a processor configured to: prohibit setting performed for automatic execution of a processing instruction causing a series of registered processing steps to be performed, the automatic execution being performed on data stored in a storage area, or prohibit manual execution, of the processing instruction, on the data stored in the storage area.

20 Claims, 11 Drawing Sheets

INFORMATION PROCESSING APPARATUS, METHOD, AND NON-TRANSITORY COMPUTER READABLE MEDIUM FOR ENHANCED SECURITY OF PRIVATELY MANAGED BOX

CROSS-REFERENCE TO RELATED APPLICATIONS

This application is based on and claims priority under 35 USC 119 from Japanese Patent Application No. 2021-143135 filed Sep. 2, 2021.

BACKGROUND

(i) Technical Field

The present disclosure relates to an information processing apparatus, an information processing method, and a non-transitory computer readable medium.

(ii) Related Art

Information processing apparatuses such as multifunctional printers (MFPs) have been designed to have a logical storage area referred to as a security box, a personal box, or the like, and fax data, scan data, print data, and other pieces of data are stored in the storage area. In addition, a system for executing a processing instruction referred to as a job flow for performing a series of registered processing steps is also known. In the system, the job flow is associated with a storage area such as a personal box. The associated processing instruction is automatically executed on data stored in the storage area or is manually executed by a user (see Japanese Unexamined Patent Application Publication No. 2002-135602).

SUMMARY

A processing instruction enables output of information regarding data to an apparatus (external apparatus) outside a network, such as Internet faxing, e-mailing, or printing of data. For example, suppose a case where a user of an information processing apparatus privately manages a storage area. For example, if a different user performs setting for the automatic execution of a processing instruction to transfer data stored in the storage area to the external apparatus, or if the different user manually executes the processing instruction, it is possible that an event unfavorable from the security view point occurs. For example, the data in the storage area is transferred to the external apparatus without the user or an administrator authorized to manage the information processing apparatus knowing the transfer.

Aspects of non-limiting embodiments of the present disclosure relate to an information processing apparatus, an information processing method, and a non-transitory computer readable medium that are enabled to prevent processing not intended by a user or an administrator from being performed in executing a processing instruction on data stored in the storage area.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: prohibit setting performed for automatic execution of a processing instruction causing a series of registered processing steps to be performed, the automatic execution being performed on data stored in a storage area, or prohibit manual execution, of the processing instruction, on the data stored in the storage area.

BRIEF DESCRIPTION OF THE DRAWINGS

An exemplary embodiment of the present disclosure will be described in detail based on the following figures, wherein.

DETAILED DESCRIPTION

Figure 1:
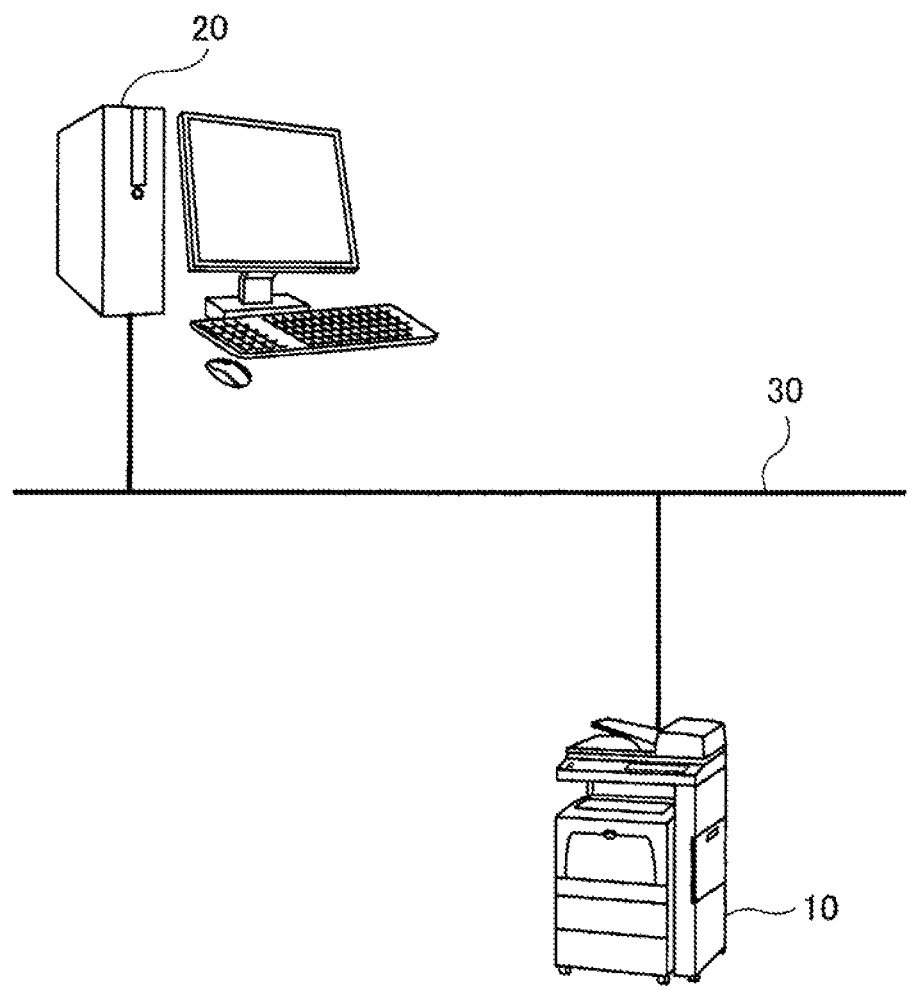
FIG. 1 is a diagram illustrating the system configuration of an image forming system of the exemplary embodiment of the present disclosure.

Hereinafter, an example exemplary embodiment for implementing the present disclosure will be described in detail with reference to the drawings. FIG. 1 is a diagram illustrating the system configuration of an image forming system of an exemplary embodiment.

As illustrated in FIG. 1, the image forming system of this exemplary embodiment includes an image forming apparatus 10 and a terminal apparatus 20 that are connected to each other via a network 30. The terminal apparatus 20 generates print data and transmits the generated print data to the image forming apparatus 10 via the network 30. The image forming apparatus 10 receives the print data transmitted from the terminal apparatus 20 and outputs an image according to the print data on the sheet. The image forming apparatus 10 is what is called a MFP having multiple functions such as a printing function, a scanning function, a copying function, and a faxing function. The image forming apparatus 10 is an example of an information processing apparatus based on the technology of the present disclosure.

Figure 2:
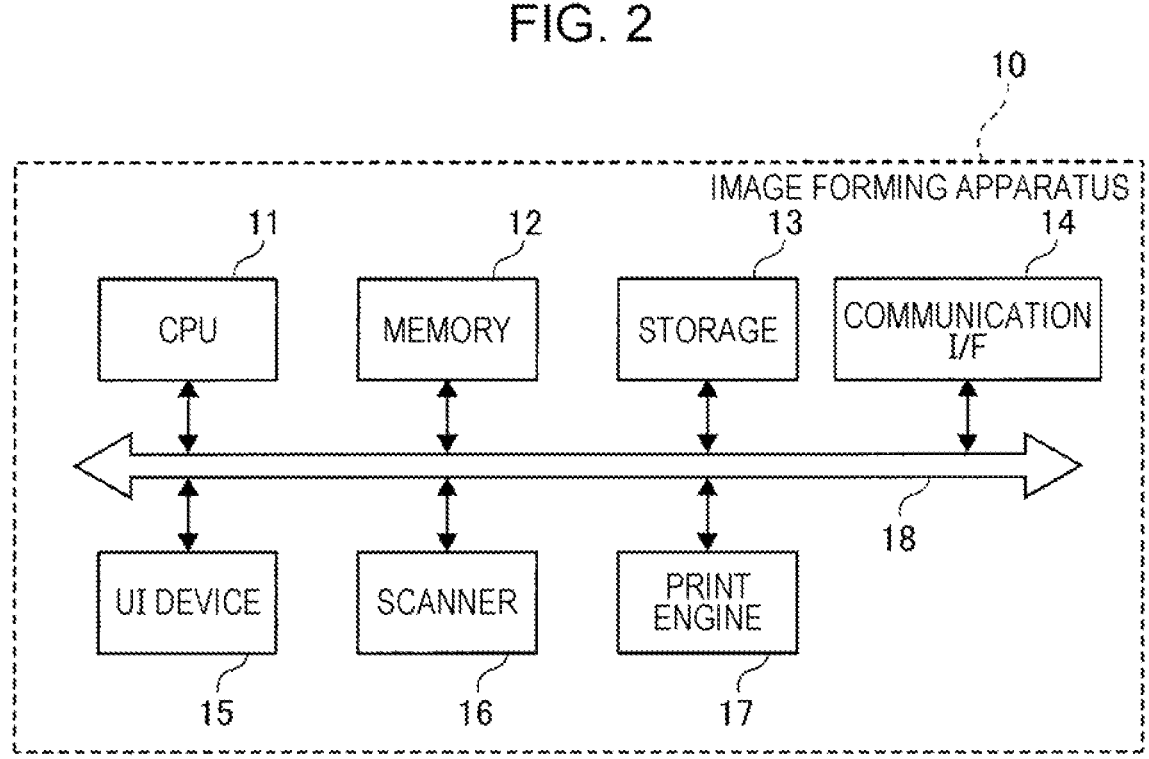
FIG. 2 is a block diagram illustrating the hardware configuration of an image forming apparatus of the exemplary embodiment of the present disclosure.

FIG. 2 illustrates the hardware configuration of the image forming apparatus 10 in the image forming system of this exemplary embodiment.

As illustrated in FIG. 2, the image forming apparatus 10 includes a central processing unit (CPU) 11, a memory 12, a storage 13 such as a hard disk, a communication interface (abbreviated as IF) 14 that transmits and receives data to and from an external apparatus or other apparatuses via the network 30, a user interface (abbreviated as UI) device 15 having a keyboard and either a touch panel or a liquid crystal display, a scanner 16, and a print engine 17. These components are connected to each other via a control bus 18.

The print engine 17 performs charging, exposure, development, transfer, and fixing processes and other processes and then prints an image on the recording medium such as a printing sheet.

The CPU 11 is a processor configured to control operations of the image forming apparatus 10 by executing predetermined processes on the basis of a control program stored in the memory 12 or the storage 13. In the description in this exemplary embodiment, the CPU 11 reads the control program stored in the memory 12 or the storage 13 and then runs the control program; however, the control program stored in a storage medium such as a compact disc read only memory (CD-ROM) may be provided to the CPU 11.

In this exemplary embodiment, one or more logical storage areas each referred to as a personal box are provided in the storage 13 of the image forming apparatus 10. Each personal box is capable of storing fax data, scan data, print data, and other pieces of data. Further, a processing instruction referred to as a job flow for performing a series of registered processing steps is associated with the personal box, and the associated job flow may be automatically executed on the data stored in the personal box or may be manually executed by a user.

Figure 3:
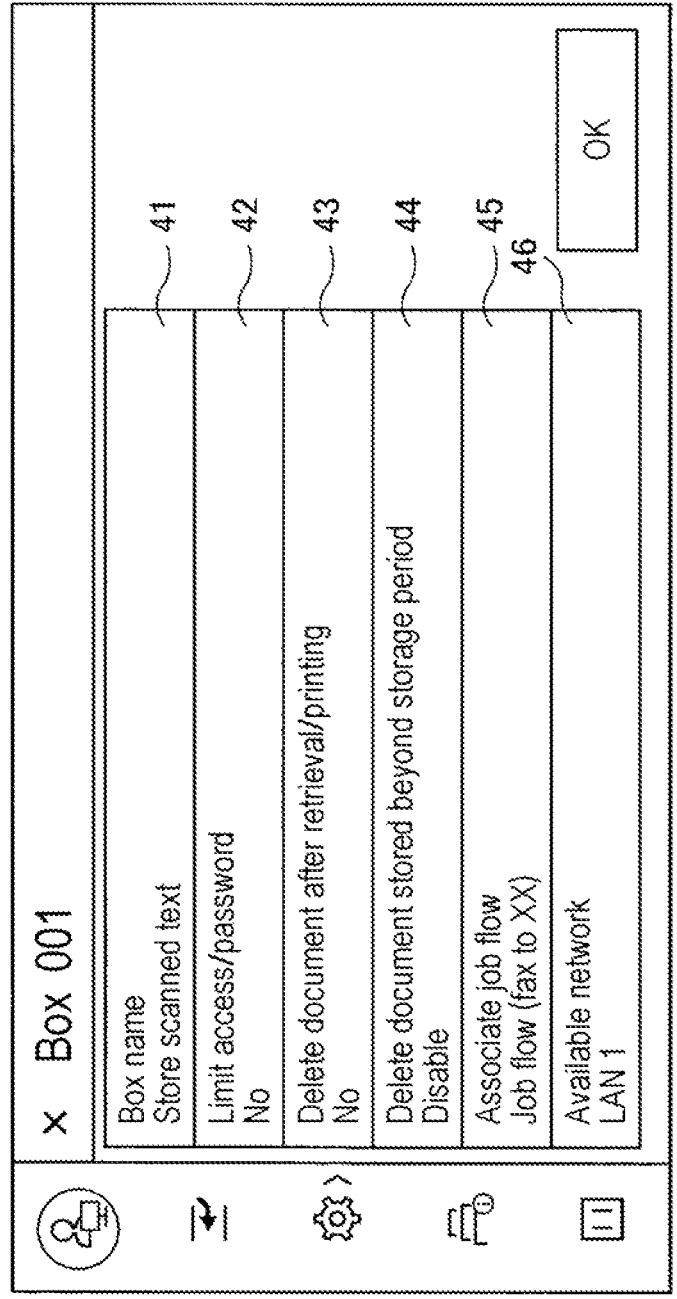
FIG. 3 is a view illustrating an example of a setting screen for a personal box in the image forming apparatus of the exemplary embodiment of the present disclosure.

FIG. 3 is a view illustrating an example of a setting screen for a personal box (personal box setting screen). As illustrated in FIG. 3, each personal box is managed by using a box number serving as an identifier. The personal box setting screen has various buttons such as a Box name button 41 for setting the name of the personal box, a Limit access/password button 42 for setting access limitation and a password for the personal box, a Delete document after retrieval/printing button 43 for setting whether to delete data stored in the personal box after the data is retrieved or printed, a Delete document stored beyond storage period button 44 for setting whether to delete data stored in the personal box when a period in which the data is stored reaches or exceeds a set period, an Associate job flow button 45 for setting a job flow for automatic execution on data stored in the personal box, and an Available network button 46 for setting an available network for data stored in the personal box. The current settings for these respective items are displayed on the buttons.

For the personal box, a user who has created the personal box is registered as the owner of the personal box. The Limit access/password button 42 is designed to enable settings for allowing only the owner to read or retrieve various pieces of stored data and allowing only an administrator or only multiple users to read or retrieve the various pieces of data.

In addition, each personal box is managed by using a box number serving as an identifier, and data resulting from processing may be stored in a specified personal box.

Further, for the personal box, a network to be used may be set with the Available network button 46, and a job flow for automatic execution on the data stored in the personal box may be set with the Associate job flow button 45. It is thus possible to automatically execute, on document data and image data stored in the personal box, a job flow such as transfer to a specific destination, faxing, or e-mailing.

Figure 4:
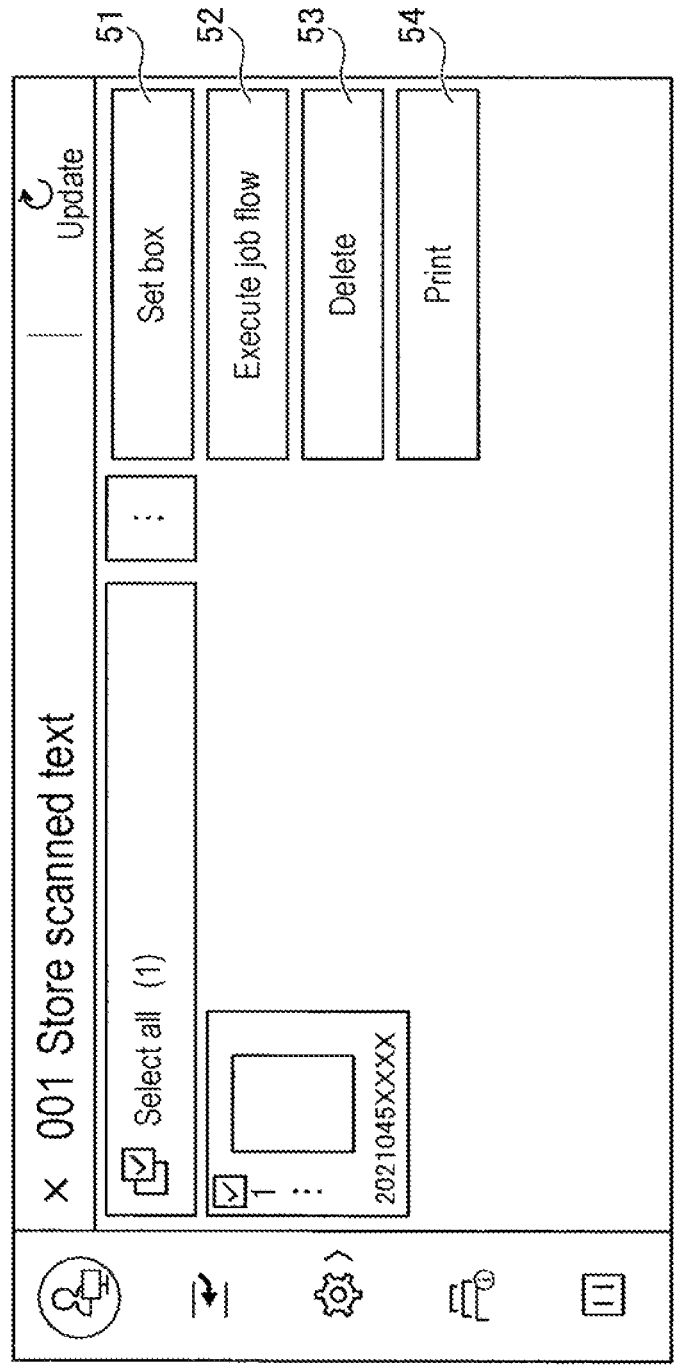
FIG. 4 is a view illustrating an example of an operation screen for the personal box in the image forming apparatus of the exemplary embodiment of the present disclosure.

FIG. 4 is a view illustrating an example of an operation screen for the personal box (personal box operation screen). As illustrated in FIG. 4, the personal box operation screen has various buttons such as a Set box button 51 for transitioning to the personal box setting screen, an Execute job flow button 52 for manually executing a job flow on data in the personal box, a Delete button 53 for deleting data in the personal box, and a Print button 54 for printing data in the personal box.

For example, suppose a case where a user privately manages a personal box. If a different user sets automatic execution of the job flow for transferring data in the personal box to the external apparatus, or if the different user manually executes the job flow for transferring the data to the external apparatus, it is possible that an event unfavorable from the security view point occurs. For example, the data in the personal box is transferred to the external apparatus without the owner of the personal box or an administrator authorized to manage the image forming apparatus 10 knowing the transfer.

Hence, in this exemplary embodiment, the CPU 11 prohibits the setting for the automatic execution of the job flow on the data stored in the personal box or prohibits the manual execution of the job flow on the data stored in the personal box.

Specifically, any job flow other than the job flow set for the personal box by the administrator authorized to manage the image forming apparatus 10 is prevented from being set with the Associate job flow button 45 on the personal box setting screen, or a user is prevented from manually executing, from the personal box operation screen, the job flow for the data stored in the personal box.

Figure 5:
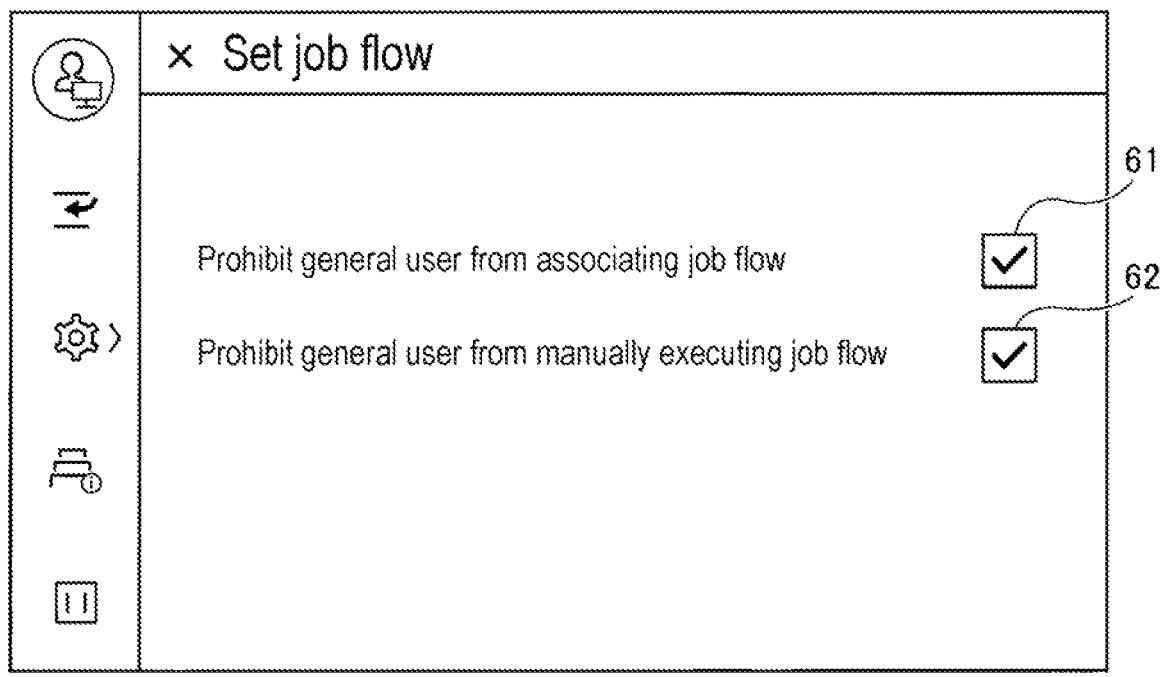
FIG. 5 is a view illustrating an example of a job flow setting screen for administrator in the image forming apparatus of the exemplary embodiment of the present disclosure.

Settings as described above may be made for the image forming apparatus 10, for example, by the administrator authorized to manage the image forming apparatus 10 at their discretion. FIG. 5 is a view illustrating an example of a job flow setting screen for administrator. As illustrated in FIG. 5, the job flow setting screen for administrator has a checkbox 61 for the item "Prohibit general user from associating job flow" and a checkbox 62 for the item "Prohibit general user from manually executing job flow".

The job flow setting screen for administrator is a setting screen only accessible by the administrator. If the checkbox 61 for the item "Prohibit general user from associating job flow" is checked, the CPU 11 prohibits the setting for the automatic execution of the job flow on the data stored in the personal box. If the checkbox 62 for the item "Prohibit general user from manually executing job flow" is checked, the CPU 11 prohibits the manual execution of the job flow on the data stored in the personal box.

Figure 6:
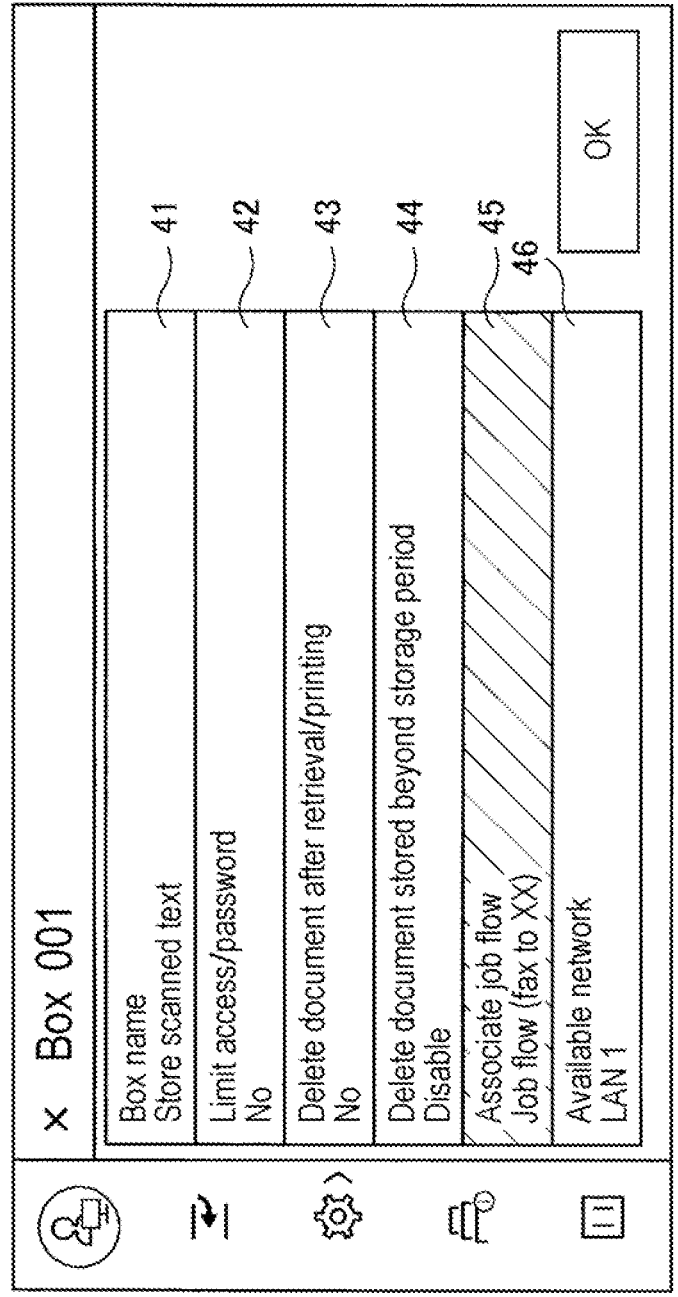
FIG. 6 is a view illustrating an example of the setting screen for the personal box in the image forming apparatus of the exemplary embodiment of the present disclosure, the setting screen being in a state where an Associate job flow button is grayed out.
Figure 7:
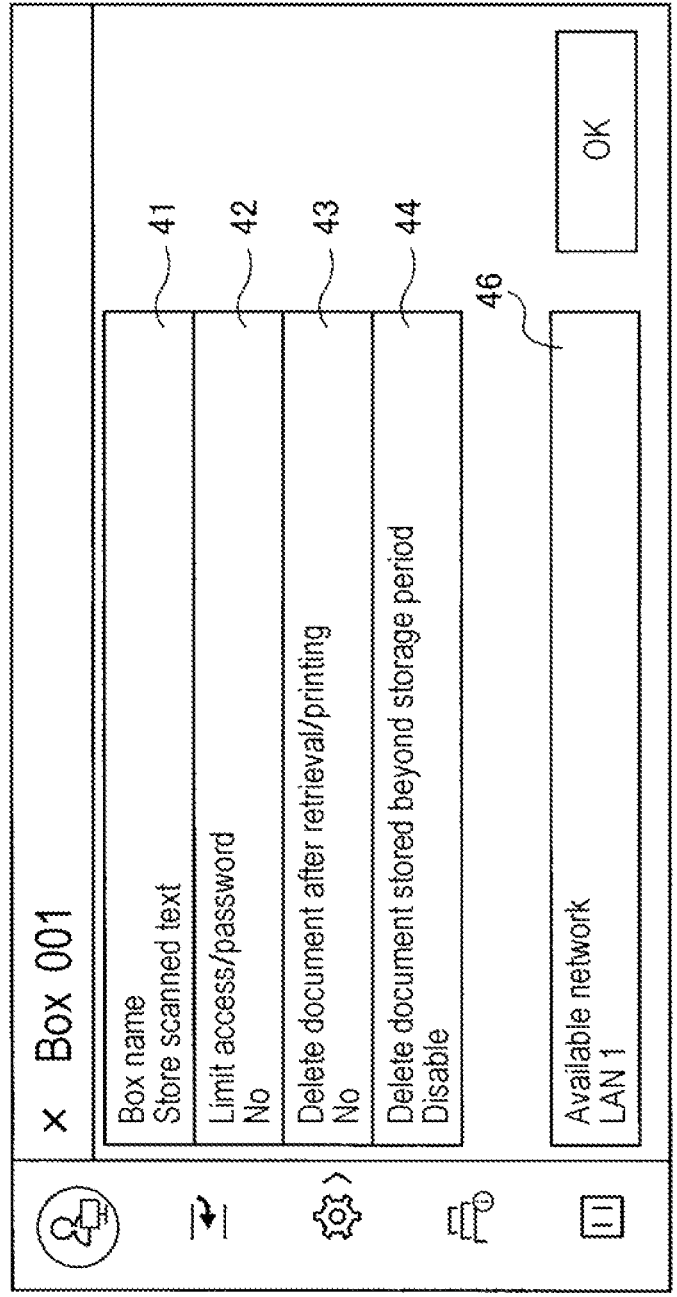
FIG. 7 is a view illustrating an example of the setting screen for the personal box in the image forming apparatus of the exemplary embodiment of the present disclosure, the setting screen being in a state where the Associate job flow button is not displayed.

To prevent the job flow set for the personal box from being changed, the Associate job flow button 45 may be disabled on the personal box setting screen, for example, by graying out the Associate job flow button 45 as illustrated in FIG. 6 or by making the Associate job flow button 45 disappear as illustrated in FIG. 7.

Figure 8:
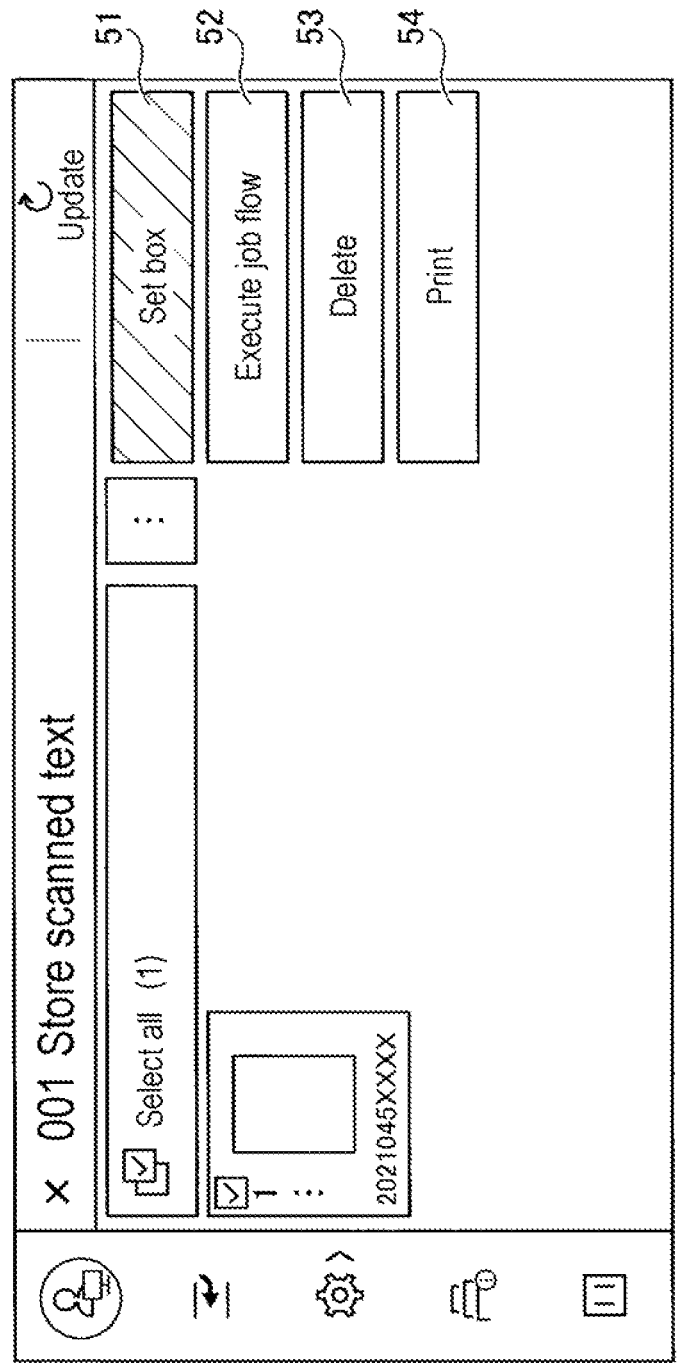
FIG. 8 is a view illustrating an example of the operation screen for the personal box in the image forming apparatus of the exemplary embodiment of the present disclosure, the operation screen being in a state where a Set box button is grayed out.
Figure 9:
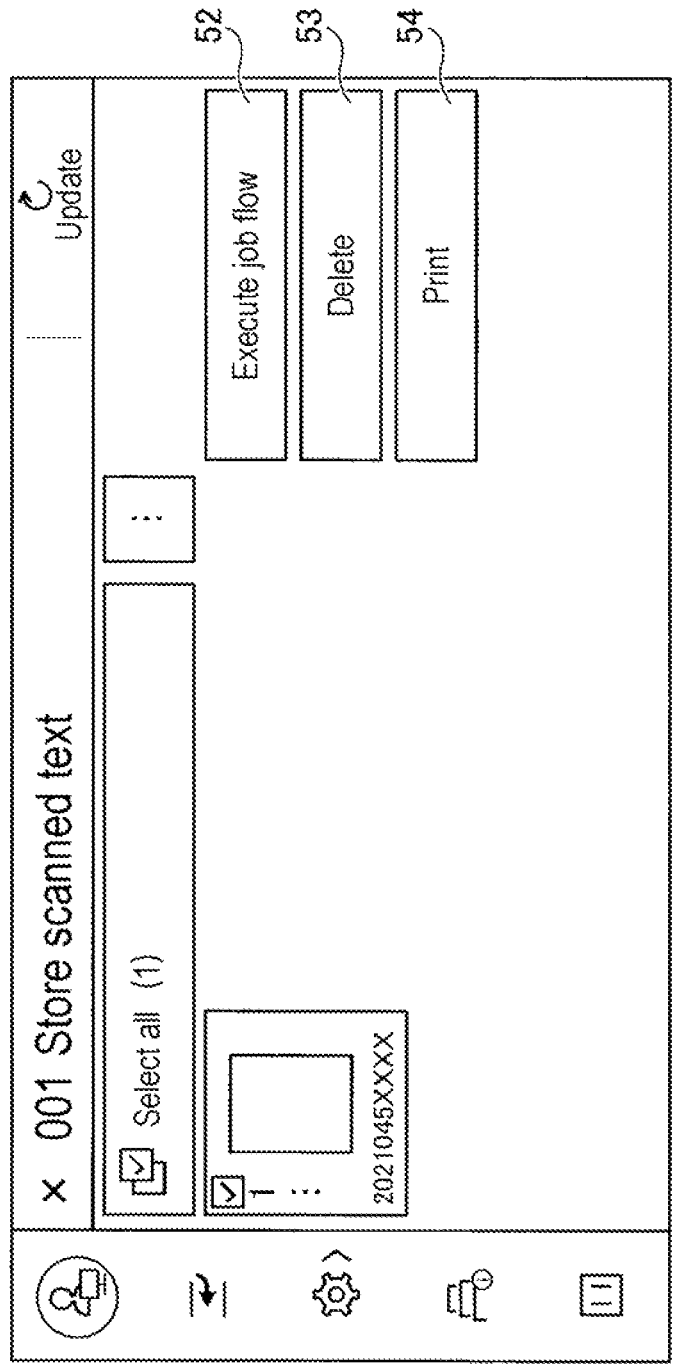
FIG. 9 is a view illustrating an example of the operation screen for the personal box in the image forming apparatus of the exemplary embodiment of the present disclosure, the operation screen being in a state where the Set box button is not displayed.

Alternatively, the Set box button 51 may be disabled on the personal box operation screen to prevent a general user from displaying the personal box setting screen, for example, by graying out the Set box button 51 as illustrated in FIG. 8 or by making the Set box button 51 disappear as illustrated in FIG. 9.

Figure 10:
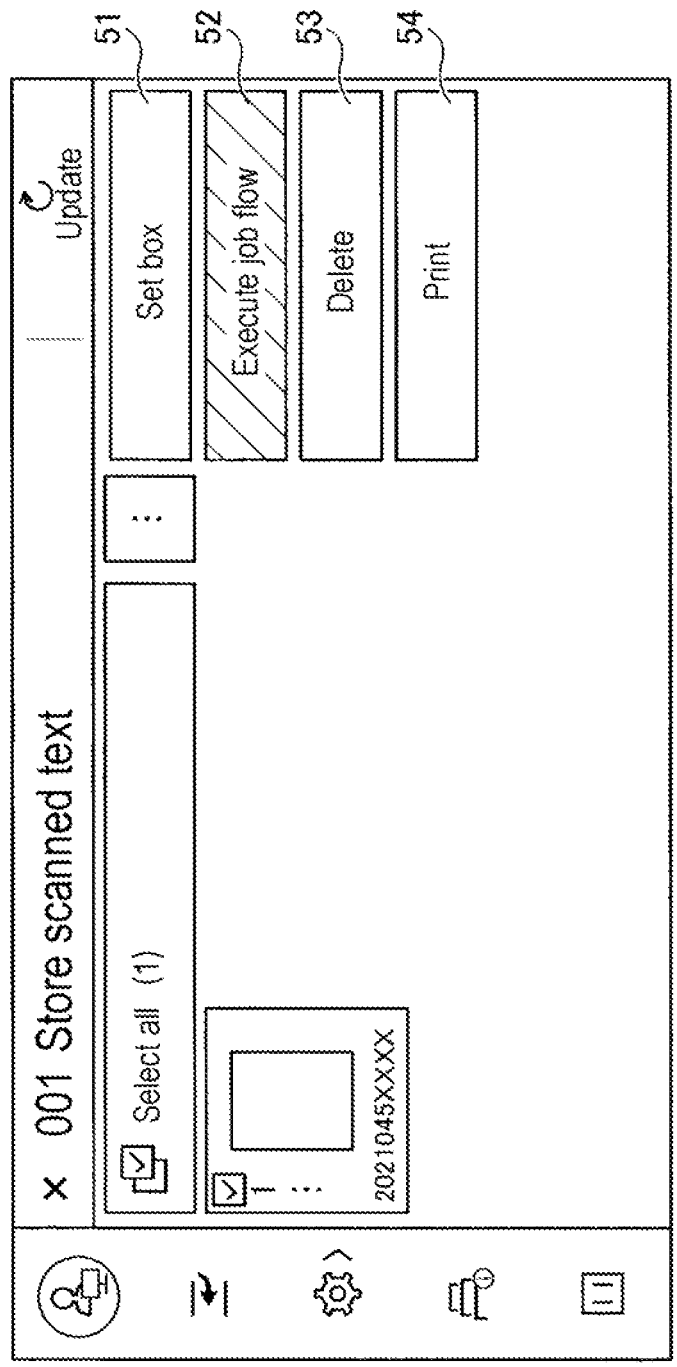
FIG. 10 is a view illustrating an example of the operation screen for the personal box in the image forming apparatus of the exemplary embodiment of the present disclosure, the operation screen being in a state where an Execute job flow button is grayed out.
Figure 11:
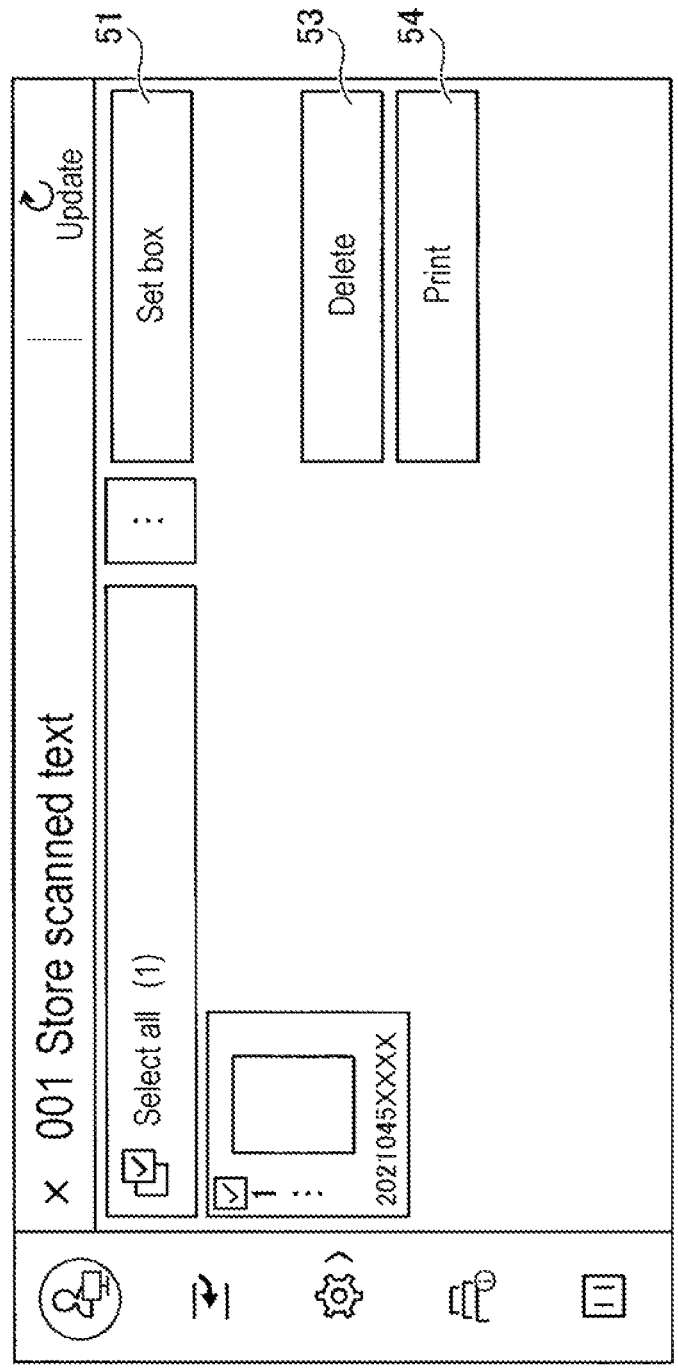
FIG. 11 is a view illustrating an example of the operation screen for the personal box in the image forming apparatus of the exemplary embodiment of the present disclosure, the operation screen being in a state where the Execute job flow button is not displayed.

To prevent a user from manually executing the job flow on the data stored in the personal box, the Execute job flow button 52 may be disabled on the personal box operation screen, for example, by graying out the Execute job flow button 52 as illustrated in FIG. 10 or by making the Execute job flow button 52 disappear as illustrated in FIG. 11.

The execution of processing not intended by a user or the administrator may thereby be prevented.

Note that if a job flow has been associated with a personal box, and if the administrator performs setting for prohibiting a general user from associating the job flow, the CPU 11 may keep the already set association of the job flow. Alternatively, the following configuration may be used. If a job flow has been associated with a personal box by the administrator, the CPU 11 may keep the association of the job flow. In contrast, if the job flow has been associated by a general user, the CPU 11 may cancel the association of the job flow.

The automatic execution or manual execution of a job flow may be implemented as follows. The settings may be made for the image forming apparatus 10 as described above by an administrator authorized to manage the image forming apparatus 10, from a setting screen (not illustrated) at their discretion.

For example, the CPU 11 may set authentication information for a personal box. In response to the success of authentication using the authentication information, the CPU 11 may permit setting for the automatic execution of the job flow on data stored in the personal box for which the authentication information is set. Alternatively, in response to the success of the authentication using the authentication information, the CPU 11 may permit the manual execution of the job flow on the data stored in the personal box for which the authentication information is set.

The CPU 11 may also permit a user who has created the personal box to perform the setting for the automatic execution of the job flow on the data stored in the personal box or permit the user who has created the personal box to perform the manual execution of the job flow on the data stored in the personal box.

In response to the data stored in the personal box being generated within a predetermined network, the CPU 11 may prohibit transfer of the data to an apparatus outside the predetermined network, the transfer being caused by the execution of the job flow.

In response to the data stored in the personal box being generated outside the predetermined network, the CPU 11 may prohibit transfer or printing of the data, the transfer or the printing being caused by the execution of the job flow.

The predetermined network is, for example, a network of an organization to which a user of the image forming apparatus 10 belongs.

In response to the data stored in the personal box being set as confidential information, the CPU 11 may prohibit specific processing caused by the execution of the job flow.

In response to the creator of the data stored in the personal box matching the creator of the job flow, the CPU 11 may permit specific processing performed on the data stored in the personal box, the specific processing being caused by the execution of the job flow.

The specific processing is, for example, transfer or printing of data.

In response to the nonexecution of user authentication, the CPU 11 may permit the setting for the automatic execution of only the job flow created by the administrator, the automatic execution being performed on the data stored in the personal box, or may permit the manual execution, of only the job flow created by the administrator, on the data stored in the personal box.

In response to the execution of user authentication, the CPU 11 may permit the setting for the automatic execution of only the job flow created by an authenticated user and only the job flow created by an administrator, the automatic execution being performed on the data stored in the personal box, or permit the manual execution, of only the job flow created by the authenticated user and the job flow created by the administrator, on the data stored in the personal box.

In response to an administrator performing the setting for the automatic execution of the job flow on the data stored in the personal box, the CPU 11 may prohibit a different user from changing the job flow.

Modification

The image forming system of the exemplary embodiment of the present disclosure has heretofore been described. The present disclosure is not limited to the exemplary embodiment described above and may be modified appropriately.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The exemplary embodiment has heretofore been described by using the case where the present disclosure is applied to the image forming apparatus. The present disclosure is not limited to this case and is also applicable to various information processing apparatuses.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
in response to an instruction from a user currently operating the information processing apparatus, display a setting screen dedicated for a box, the box being a logical storage area storing data;
while the setting screen dedicated for the box is displayed, prohibit the user from changing setting for automatic execution of a processing instruction causing a series of registered processing steps to be performed on the data stored in the box;
in response to an instruction from the user, display an operation screen dedicated for the box; and
while the operation screen dedicated for the box is displayed, prohibit the user from instructing manual execution of the processing instruction on the data stored in the box.

2. The information processing apparatus according to claim 1,
wherein the processor is configured to:
set authentication information for the box; and
in response to success of authentication using the authentication information, permit the user for changing the setting for the automatic execution of the processing instruction on the data stored in the box for which the authentication information is set, or
in response to the success of the authentication using the authentication information, permit the user for instructing the manual execution of the processing instruction on the data stored in the box for which the authentication information is set.

3. The information processing apparatus according to claim 2,
wherein the processor is configured to:
in response to the data stored in the box being generated within a predetermined network, prohibit transfer of the data to an apparatus outside the predetermined network, the transfer being caused by execution of the processing instruction.

4. The information processing apparatus according to claim 3,
wherein the processor is configured to:
in response to the data stored in the box being generated outside the predetermined network, prohibit the transfer or printing of the data, the transfer or the printing being caused by execution of the processing instruction.

5. The information processing apparatus according to claim 2,
wherein the processor is configured to:
in response to the data stored in the box being generated outside a predetermined network, prohibit transfer or printing of the data, the transfer or the printing being caused by execution of the processing instruction.

6. The information processing apparatus according to claim 1,
wherein the processor is configured to:
permit a user who has created the box to change the setting for the automatic execution of the processing instruction on the data stored in the box or permit the user who has created the box to instruct the manual execution of the processing instruction on the data stored in the box.

7. The information processing apparatus according to claim 3,
wherein the processor is configured to:
in response to the data stored in the box being generated within a predetermined network, prohibit transfer of the data to an apparatus outside the predetermined network, the transfer being caused by execution of the processing instruction.

8. The information processing apparatus according to claim 6,
wherein the processor is configured to:
in response to the data stored in the box being generated outside a predetermined network, prohibit transfer or printing of the data, the transfer or the printing being caused by execution of the processing instruction.

9. The information processing apparatus according to claim 1,
wherein the processor is configured to:
in response to the data stored in the box being generated within a predetermined network, prohibit transfer of the data to an apparatus outside the predetermined network, the transfer being caused by execution of the processing instruction.

10. The information processing apparatus according to claim 9,
wherein the processor is configured to:
in response to the data stored in the box being generated outside the predetermined network, prohibit the transfer or printing of the data, the transfer or the printing being caused by execution of the processing instruction.

11. The information processing apparatus according to claim 9,
wherein the predetermined network is a network of an organization to which the user of the information processing apparatus belongs.

12. The information processing apparatus according to claim 1,
wherein the processor is configured to:
in response to the data stored in the box being generated outside a predetermined network, prohibit transfer or printing of the data, the transfer or the printing being caused by execution of the processing instruction.

13. The information processing apparatus according to claim 1,
wherein the processor is configured to:
in response to the data stored in the box being set as confidential information, prohibit specific processing caused by execution of the processing instruction.

14. The information processing apparatus according to claim 13,
wherein the specific processing is transfer or printing of data.

15. The information processing apparatus according to claim 1,
wherein the processor is configured to:
in response to a creator of the data stored in the box matching a creator of the processing instruction, permit specific processing performed on the data stored in the box, the specific processing being caused by execution of the processing instruction.

16. The information processing apparatus according to claim 1,
wherein the processor is configured to:
in response to nonexecution of user authentication, permit the user to change the setting for the automatic execution of only the processing instruction created by a specific administrator on the data stored in the box, or permit the user to instruct the manual execution of only the processing instruction created by the specific administrator on the data stored in the box.

17. The information processing apparatus according to claim 1,
wherein the processor is configured to:
in response to execution of user authentication, permit the user to change the setting for the automatic execution of only the processing instruction created by an authenticated user and only the processing instruction created by a specific administrator, on the data stored in the box, or permit the user to instruct the manual execution of only the processing instruction created by the authenticated user and only the processing instruction created by the specific administrator, on the data stored in the box.

18. The information processing apparatus according to claim 1,
wherein the processor is configured to:
in response to a specific administrator changing the setting for the automatic execution of the processing instruction on the data stored in the box, prohibit a different user from changing the processing instruction.

19. An information processing method comprising:
in response to an instruction from a user currently operating the information processing apparatus, displaying a setting screen dedicated for a box, the box being a logical storage area storing data;
while the setting screen dedicated for the box is displayed, prohibiting the user from changing setting for automatic execution of a processing instruction causing a series of registered processing steps to be performed on the data stored in the box;
in response to an instruction from the user, displaying an operation screen dedicated for the box; and
while the operation screen dedicated for the box is displayed, prohibiting the user from instructing manual execution of the processing instruction on the data stored in the box.

20. A non-transitory computer readable medium storing a program causing a computer to execute a process comprising:
in response to an instruction from a user currently operating the information processing apparatus, displaying a setting screen dedicated for a box, the box being a logical storage area storing data;
while the setting screen dedicated for the box is displayed, prohibiting the user from changing setting for automatic execution of a processing instruction causing a series of registered processing steps to be performed on the data stored in the box;
in response to an instruction from the user, displaying an operation screen dedicated for the box; and
while the operation screen dedicated for the box is displayed, prohibiting the user from instructing manual execution of the processing instruction on the data stored in the box.

* * * * *